United States Patent
MacKenzie et al.

(10) Patent No.: US 12,128,949 B2
(45) Date of Patent: Oct. 29, 2024

(54) VEHICLE CONTROL METHOD AND APPARATUS TO REVERSE A TRAILER

(71) Applicant: HYUNDAI MOBIS CO., LTD., Seoul (KR)

(72) Inventors: Douglas MacKenzie, Plymouth, MI (US); Venkatesh Dudiki, Plymouth, MI (US)

(73) Assignee: HYUNDAI MOBIS CO., LTD., Seoul (KR)

(*) Notice: Subject to any disclaimer, the term of this patent is extended or adjusted under 35 U.S.C. 154(b) by 99 days.

(21) Appl. No.: 17/950,169

(22) Filed: Sep. 22, 2022

(65) Prior Publication Data
US 2024/0101193 A1    Mar. 28, 2024

(51) Int. Cl.
*B62D 13/06* (2006.01)

(52) U.S. Cl.
CPC .................... *B62D 13/06* (2013.01)

(58) Field of Classification Search
CPC ...... B62D 13/06; B62D 1/02; B62D 15/0285; B60W 30/18036; B60W 30/10; B60W 2050/0005; B60W 2300/145; B60W 2520/06; B60D 1/245; B60Y 2200/148
See application file for complete search history.

(56) References Cited

U.S. PATENT DOCUMENTS

| | | | |
|---|---|---|---|
| 2014/0229070 A1* | 8/2014 | Witting | B62D 13/06 701/42 |
| 2016/0068158 A1* | 3/2016 | Elwart | B60W 30/06 701/1 |
| 2016/0114831 A1* | 4/2016 | Laine | G08G 1/168 701/41 |
| 2016/0152263 A1* | 6/2016 | Singh | B60T 8/1708 701/41 |
| 2017/0144701 A1* | 5/2017 | Medagoda | B62D 15/025 |
| 2018/0356214 A1* | 12/2018 | Kozak | G01B 11/272 |
| 2019/0346856 A1* | 11/2019 | Berkemeier | G05D 1/0212 |
| 2019/0375450 A1* | 12/2019 | Medagoda | B62D 15/0285 |
| 2021/0294333 A1* | 9/2021 | Jing | B62D 15/025 |
| 2021/0347410 A1* | 11/2021 | Niewiadomski | B62D 15/028 |
| 2022/0228878 A1* | 7/2022 | Johansson | G06V 20/56 |
| 2022/0333933 A1* | 10/2022 | Ma | G01C 21/3407 |
| 2023/0303161 A1* | 9/2023 | Bolduc | B60W 30/18036 |
| 2024/0034113 A1* | 2/2024 | Laine | B60D 1/62 |

* cited by examiner

*Primary Examiner* — Sze-Hon Kong
(74) *Attorney, Agent, or Firm* — NSIP Law

(57) ABSTRACT

A vehicle control method and apparatus to reverse a trailer are provided. The method includes storing a moving path of a trailer connected to the vehicle by a hitch, measuring a location of the trailer or a heading of the trailer when the trailer is reversed upon activation of a reversing mode, comparing the location of the trailer or the heading of the trailer in the stored moving path of the trailer with the measured location of the trailer or the measured heading of the trailer, and minimizing a difference between the location of the trailer in the stored moving path of the trailer and the measured location of the trailer, or a difference between the heading of the trailer in the stored moving path of the trailer and the measured heading of the trailer, and t performing an operation of reversing the trailer.

11 Claims, 9 Drawing Sheets

VEHICLE CONTROL METHOD AND APPARATUS TO REVERSE A TRAILER

BACKGROUND

1. Field

The following description relates to a vehicle control method and apparatus to reverse a trailer. More particularly, the following description relates to a method and an apparatus to control a vehicle to reverse a trailer, which stores the moving path of the trailer and reverses the trailer according to the stored record.

2. Description of Related Art

The content described in this section merely provides the background information on the present disclosure and does not constitute the prior art.

In order to increase the safety and convenience of a driver using a vehicle, the development of technology to graft various sensors and electronic devices to the vehicle is accelerating. Thus, autonomous driving in which the vehicle itself can travel on a road without the intervention of a driver is possible.

Meanwhile, interest in automatically reversing the vehicle is increasing in autonomous driving. In particular, the automatic reversing of the trailer has a problem in that automatic reversing is difficult because a turning radius may be larger.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a vehicle control method includes storing a moving path of a trailer connected to the vehicle; measuring at least one of a location of the trailer and a heading of the trailer when the trailer is reversed upon activation of a trailer reversing mode; comparing at least one of the location of the trailer and the heading of the trailer in the stored moving path of the trailer with at least one of the measured location of the trailer and the measured heading of the trailer; and minimizing at least one of a difference between the location of the trailer in the stored moving path of the trailer and the measured location of the trailer, and a difference between the heading of the trailer in the stored moving path of the trailer and the measured heading of the trailer, and then performing an operation of reversing the trailer.

The trailer may be connected to the vehicle by a hitch.

The measuring of at least one of the location of the trailer and the heading of the trailer may include measuring at least one of the location of the trailer and the heading of the trailer, based on a location of the vehicle and a heading of the vehicle and an angle of the hitch.

The stored moving path of the trailer may be a path along which the trailer has been moved before the operation of reversing the trailer, and the location of the trailer and heading of the trailer in the stored moving path of the trailer may be stored in a non-volatile memory of the vehicle.

The storing of the moving path of the trailer may include storing a new location of the trailer when a distance between an initial location of the trailer and a current location of the trailer exceeds a first threshold.

The storing of the moving path of the trailer may include storing a new heading of the trailer when a heading between an initial heading of the trailer and a current heading of the trailer exceeds a second threshold.

The stored moving path of the trailer may correspond to a last section in a path where a driver of the vehicle drives the vehicle to move the trailer.

The initial location of the trailer may be set to a different location when a location record count of the trailer and a heading record count of the trailer exceeds a third threshold.

The initial heading of the trailer may be set to a different heading when a location record count of the trailer and a heading record count of the trailer exceeds a third threshold.

In a general aspect, a vehicle control apparatus includes a plurality of processors, wherein at least one of the processors is configured to: store a moving path of a trailer connected to the vehicle, measure at least one of a location of the trailer and a heading of the trailer when the trailer is reversed upon activation of a trailer reversing mode; compare at least one of the location of the trailer and the heading of the trailer in the stored moving path of the trailer with at least one of the measured location of the trailer and the measured heading of the trailer; and minimize at least one of a difference between the location of the trailer in the stored moving path of the trailer and the measured location of the trailer, and a difference between the heading of the trailer in the stored moving path of the trailer and the measured heading of the trailer, and then performing an operation of reversing the trailer.

The trailer may be connected to the vehicle by a hitch.

The at least one processor may be configured to measure at least one of the location of the trailer and the heading of the trailer, based on a location of the vehicle and a heading of the vehicle and an angle of the hitch.

The stored moving path of the trailer may be a path along which the trailer has been moved before the operation of reversing the trailer, and the location of the trailer and heading of the trailer in the stored moving path of the trailer may be stored in a non-volatile memory of the vehicle.

The at least one processor may be configured to store a new location of the trailer when a distance between an initial location of the trailer and a current location of the trailer exceeds a first threshold.

The at least one processor may be configured to store a new heading of the trailer when a heading between an initial heading of the trailer and a current heading of the trailer exceeds a second threshold.

The stored moving path of the trailer may correspond to a last section in a path where a driver drives the vehicle to move the trailer.

The initial location of the trailer may be set to a different location when a location record count of the trailer and a heading record count of the trailer exceeds a third threshold.

The initial heading of the trailer may be set to a different heading when a location of the record count of the trailer and a heading record count of the trailer exceeds a third threshold.

Other features and aspects will be apparent from the following detailed description, the drawings, and the claims.

The apparatus may further include a memory, storing instructions that, when executed by the processor, configures the processor to perform the storing of the moving path, the measuring of the at least one of a location of the trailer and a heading of the trailer, the comparing at least one of the location of the trailer and the heading of the trailer, and the minimizing.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
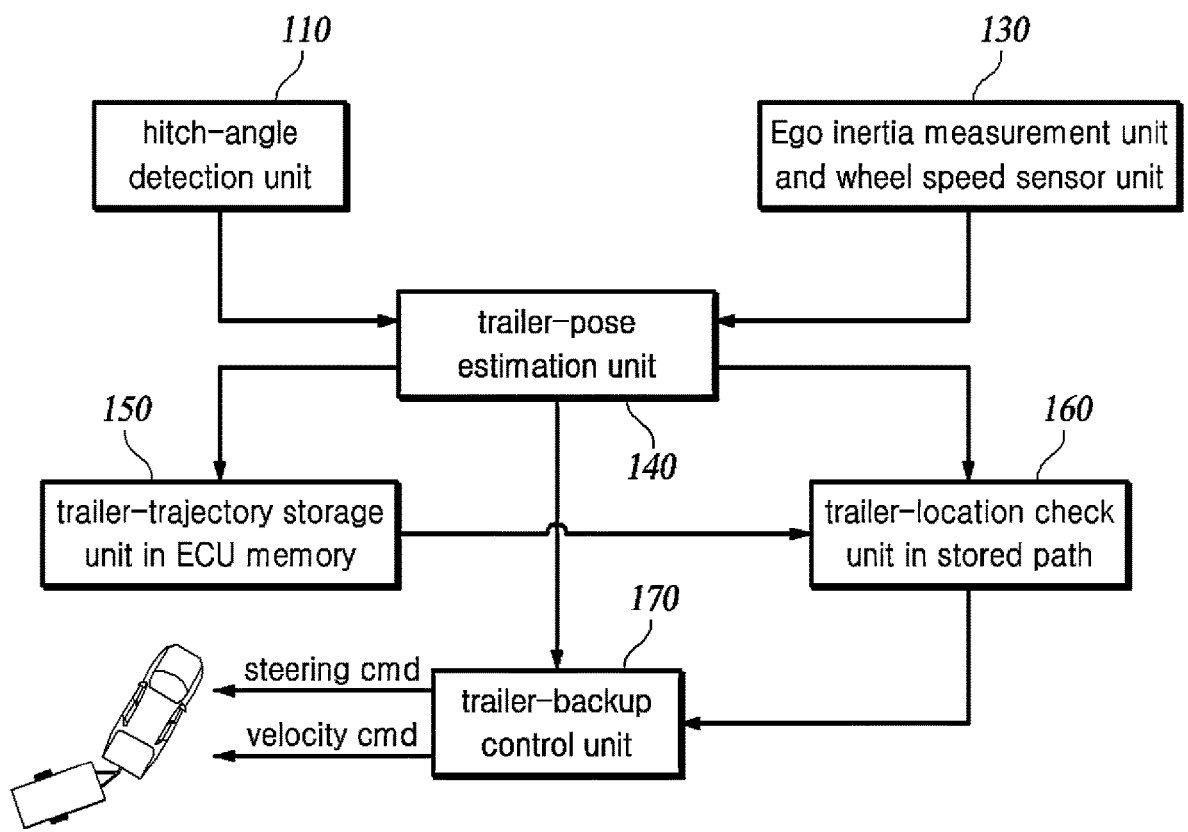
FIG. 1 is a block diagram illustrating the configuration of an apparatus to control a vehicle, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a block diagram illustrating the configuration of an apparatus for controlling a vehicle, in accordance with one or more embodiments. The vehicle control apparatus according to the present disclosure may correspond to an apparatus that automates a trailer reversing process. If a driver moves the vehicle, the vehicle control apparatus may record and store the location and heading of the trailer and the moving trajectory of the trailer. If the driver activates a reversing mode, the vehicle control apparatus may reverse the trailer according to the stored trajectory of the vehicle. When the trailer arrives at an end of the moving path, the vehicle control apparatus may stop the vehicle and the trailer and transfer the right to control to the driver.

Referring to FIG. 1, a parking system in accordance with one or more embodiments may include a hitch-angle detection unit 110, an Ego inertia measurement unit and a wheel speed sensor unit 130, a trailer-pose estimation unit 140, a trailer-trajectory storage unit 150 in an ECU (Electric Control Unit) memory, a trailer-location check unit 160 in a stored path, and a trailer-backup control unit 170. The hitch-angle detection unit 110 may detect the angle of the hitch connecting the vehicle with the trailer. The Ego inertia measurement unit and the wheel speed sensor unit 130 may measure the inertia of a host vehicle and may detect the speed. The Ego inertia measurement unit and the wheel speed sensor unit 130 may store the location and heading of the trailer and the moving trajectory of the trailer. The trailer-pose estimation unit 140 may estimate the location and heading of the trailer. The trailer-trajectory storage unit 150 in the ECU memory may store, in the ECU memory, a moving trajectory while the trailer is parked or a moving trajectory while the trailer is leaving a parking space. The trailer-location check unit 160 in the stored path may check where the trailer is located in the stored path or trajectory of the trailer. The trailer-backup control unit 170 may compare the trailer's current location and heading with the stored path and may inform a user that a trailer reversing mode is available. The trailer-backup control unit 170 may execute the reversing mode and may give a steering command and a velocity command to the vehicle.

Figure 2:
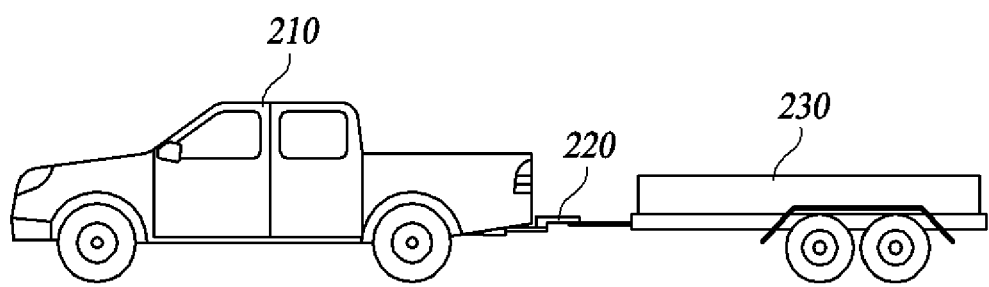
FIG. 2 is a diagram illustrating the vehicle, a trailer, and a hitch, in accordance with one or more embodiments.

FIG. 2 is a diagram illustrating the vehicle, the trailer, and the hitch, in accordance with one or more embodiments.

Referring to FIG. 2, the vehicle 210 and the trailer 230 may be connected via the hitch 220. The vehicle 210 may include a trailer parking control unit, one or more sensors that measure the location and heading of the vehicle, and one or more sensors that measure the hitch angle between the vehicle and the trailer. The vehicle 210 may tow or park the trailer 230 through the hitch 220.

Figure 3:
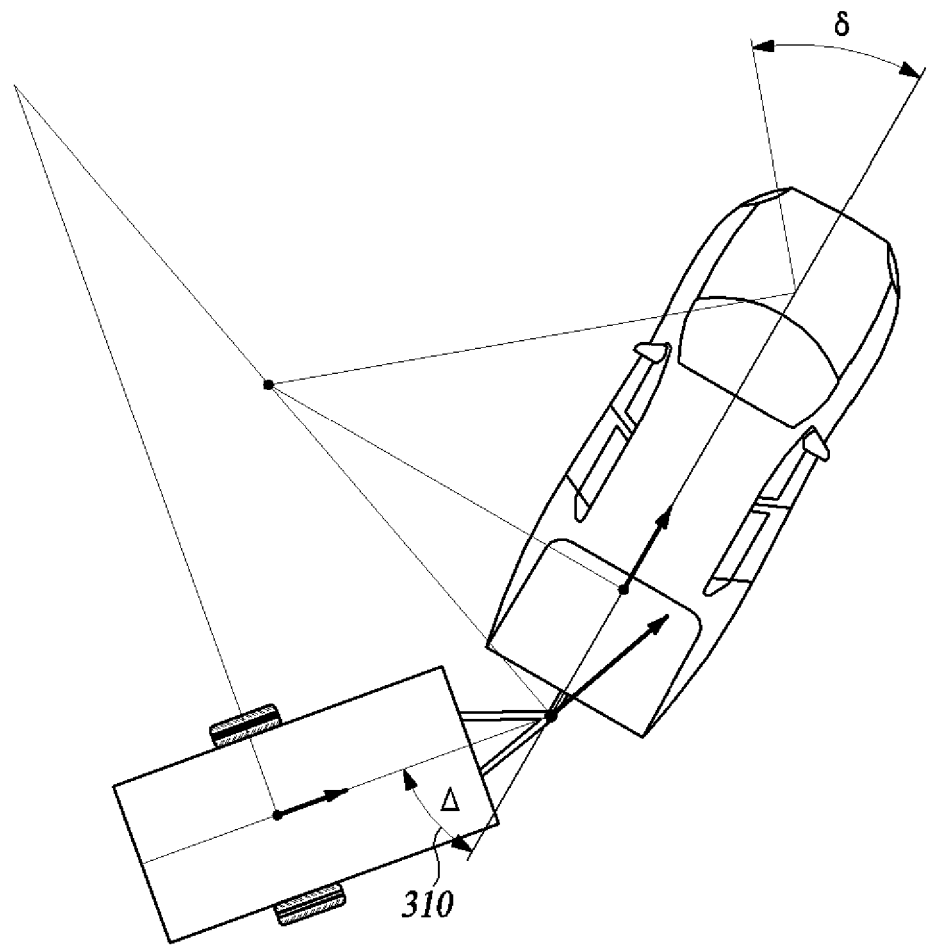
FIG. 3 is a diagram illustrating a hitch angle, in accordance with one or more embodiments.

FIG. 3 is a diagram illustrating the hitch angle, in accordance with one or more embodiments.

Referring to FIG. 3, the hitch angle 310 may correspond to an angle between a straight line passing through the center of the vehicle and a straight line passing through the center of the trailer. The hitch angle 310 may be measured by one or more sensors included in the vehicle. The location and heading of the trailer may be calculated using the hitch angle 310.

Figure 4:
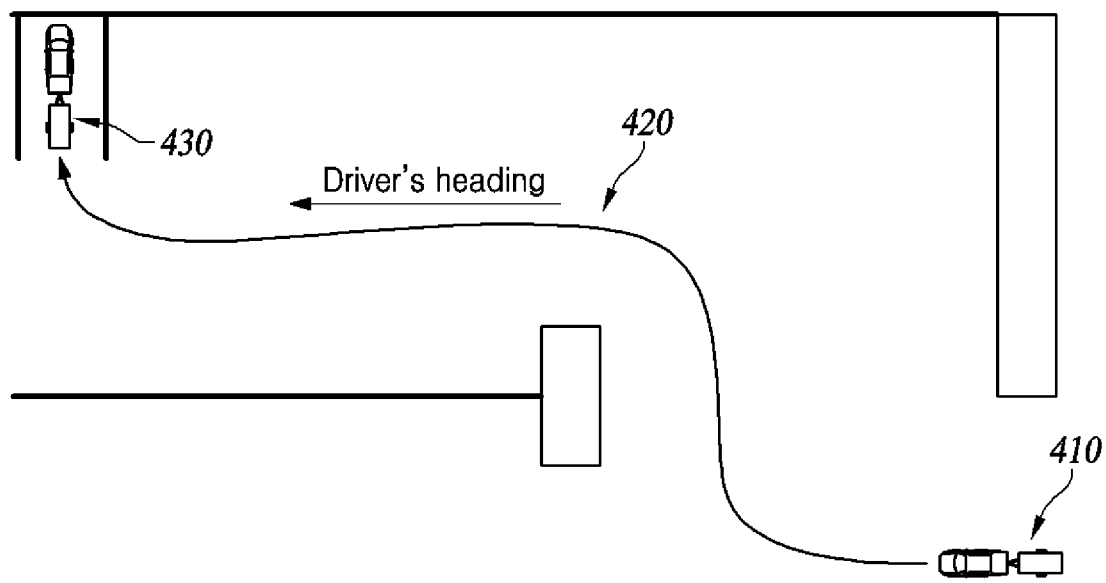
FIG. 4 is a diagram illustrating the moving path of the trailer, in accordance with one or more embodiments.

FIG. 4 is a diagram illustrating the moving path of the trailer, in accordance with one or more embodiments. A driver may manually activate a recording mode when moving the trailer by driving the vehicle. The recording mode may correspond to the mode for recording a process in which the trailer moves. The driver may activate the recording mode and drive the vehicle to move the trailer.

Referring to FIG. 4, the driver may activate the recording mode at a location 410 where the trailer starts moving. The driver may move the trailer according to the moving path 420 by driving the vehicle. At a location 430 where the movement of the trailer is terminated, the driver may end the recording mode. The moving path 420 may be recorded and stored.

Figure 5:
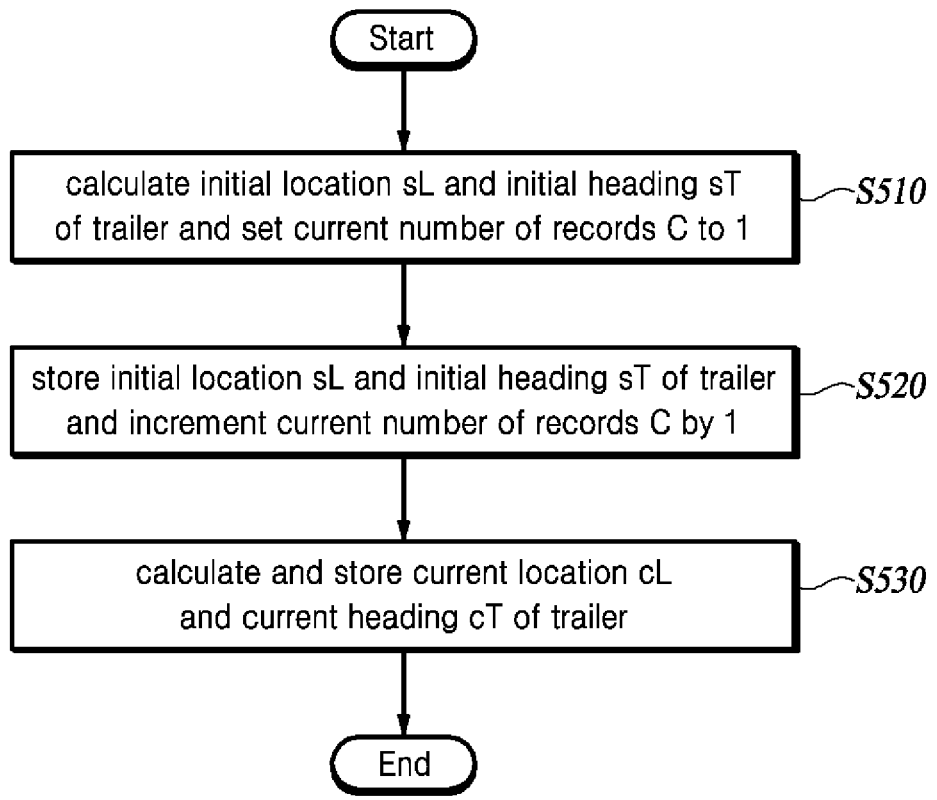
FIG. 5 is a diagram illustrating a process of storing the moving path of the trailer, in accordance with one or more embodiments.

FIG. 5 is a diagram illustrating the process of storing the moving path of the trailer, in accordance with one or more embodiments.

Referring to FIG. 5, an initial location sL of the trailer and an initial heading sT of the trailer may be calculated, and the current number of records C may be set to 1 (operation S510). While the recording mode is activated, the vehicle control apparatus may measure the location and heading of the trailer using the measured location and heading of the vehicle and the measured hitch angle. The location and heading of the trailer may correspond to a trailer pose. The initial location sL of the trailer and the initial heading sT of the trailer may be stored, and the current number of records C may be incremented by 1 (operation S520). A current location cL and a current heading cT of the trailer may be calculated and stored (operation S530). A series of trailer pose records may be recorded and stored in a non-volatile memory while the trailer is moving. Thus, the trailer's trajectory, namely, the moving path may be stored.

Only a last portion of the path of the trailer stored in the non-volatile memory may be stored. For instance, when a driver activates the recording mode and the moving path of the trailer is 100 meters, only the last 30 meters of the trailer's moving path may be stored. A driver may encounter an obstacle while driving the vehicle to move the trailer. In this case, the driver may not drive the vehicle to move the trailer because the road is narrow. The driver may reverse the trailer by reversing the vehicle. For instance, in the case that there is a traffic jam when the driver drives the vehicle with the trailer connected thereto and enters a gas station, the driver may reverse the trailer by reversing the vehicle. The driver may send a trailer reversing mode signal to the vehicle control apparatus using a driver terminal while driving the vehicle to which the trailer is connected. The vehicle control apparatus may receive the trailer reversing mode signal, copy the last trailer pose record to the non-volatile memory, and complete the storage. Further, the recording mode may be terminated.

Figure 6:
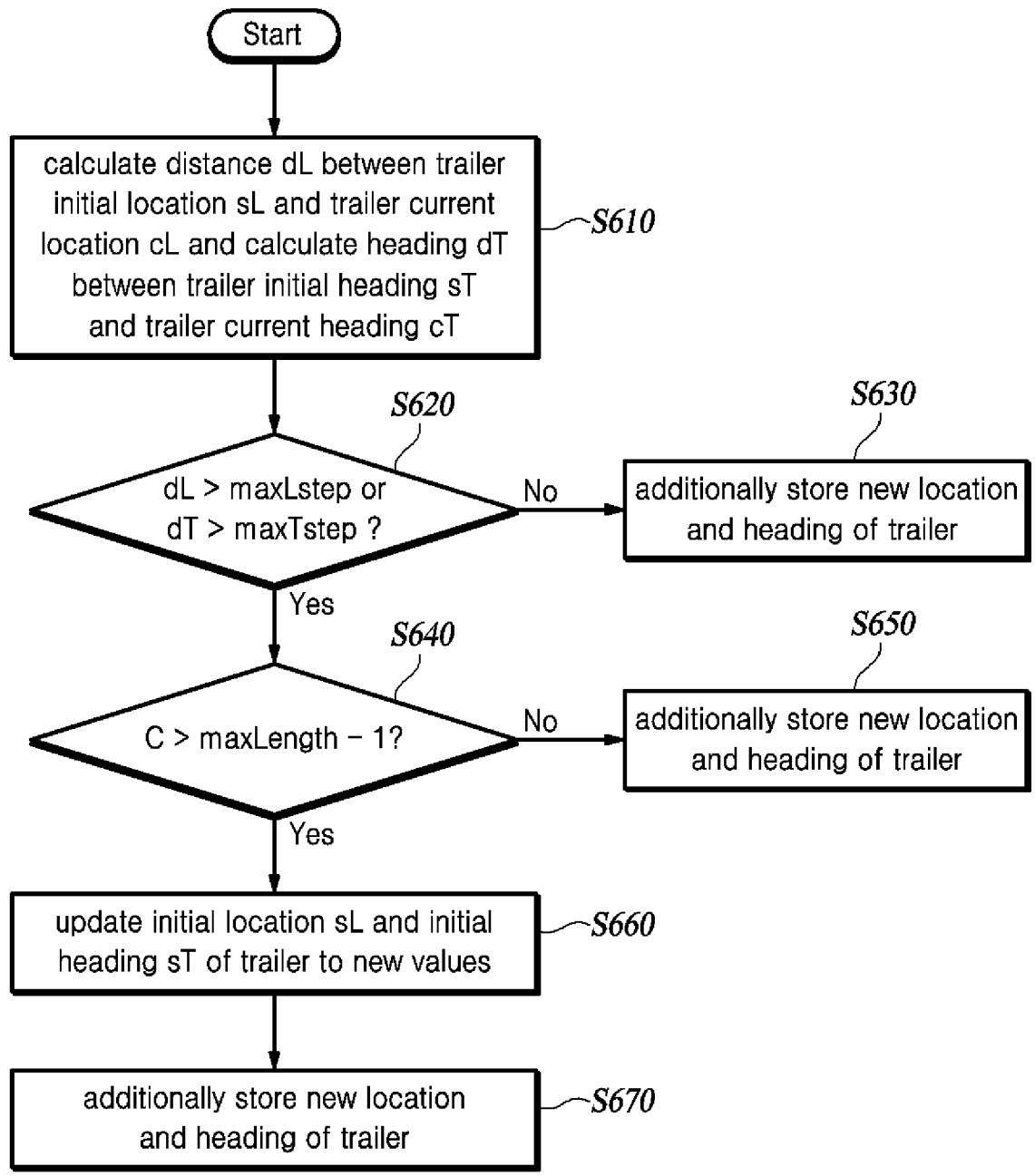
FIG. 6 is a diagram illustrating a process of storing a new location and heading of the trailer in the process of storing the moving path of the trailer, in accordance with one or more embodiments.

FIG. 6 is a diagram illustrating a process of storing a new location and heading of the trailer in the process of storing the moving path of the trailer, in accordance with one or more embodiments. A new trailer pose record may be added to the previously stored moving path of the trailer. When the trailer moves more than maxLstep or rotates more than maxTstep, the new trailer pose record may be added.

Referring to FIG. 6, a distance dL between a trailer initial location sL and a trailer current location cL may be calculated, and a heading dT between a trailer initial heading sT and a trailer current heading cT may be calculated (operation S610). It may be determined whether dL is larger than maxLstep or whether dT is larger than maxTstep (operation S620). When dL is smaller than maxLstep and dT is smaller than maxTstep (operation S620-NO), the new location and heading of the trailer may be additionally stored (operation S630). The new location and heading of the trailer may correspond to the current location and heading of the trailer. When dL is larger than maxLstep or dT is larger than maxTstep (operation S620-YES), it may be determined whether the current number of records C is larger than maxLength-1 (operation S640). There may be a limit to the maximum number of trailer pose records that may be stored in the non-volatile memory. The maximum number of trailer pose records that may be stored therein may correspond to maxLength. When the record of each trailer pose is recorded, it may be checked whether the current number of records C exceeds maxLength. When the current number of records C is smaller than maxLength-1 (operation S640-NO), the new location and heading of the trailer may be additionally stored (operation S650). The new location and heading of the trailer may correspond to the current location and heading of the trailer. When the current number of records C is larger than maxLength-1 (operation S640-YES), the initial location sL and the initial heading sT of the trailer may be updated to new values (S660). In this case, the oldest trailer pose record may be discarded. The initial location sL and the initial heading sT of the trailer may be updated to the oldest trailer pose record remaining in the non-volatile memory. The new location and heading of the trailer may be additionally stored (operation S670). The new location and heading of the trailer may correspond to the current location and heading of the trailer.

The process of storing the new location and heading of the trailer in the process of storing the moving path of the trailer described with reference to FIG. 6 is illustrative, but the process of storing the new location and heading of the trailer in the process of storing the moving path of the trailer according to the present disclosure is not limited to an example shown in FIG. 6. For example, some of steps shown in FIG. 6 may be omitted, and steps other than those shown in FIG. 6 may be added at any position on the flowchart of FIG. 6. Further, some of the steps shown in FIG. 6 may be performed simultaneously with other steps or the order of the steps may be changed.

Figure 7:
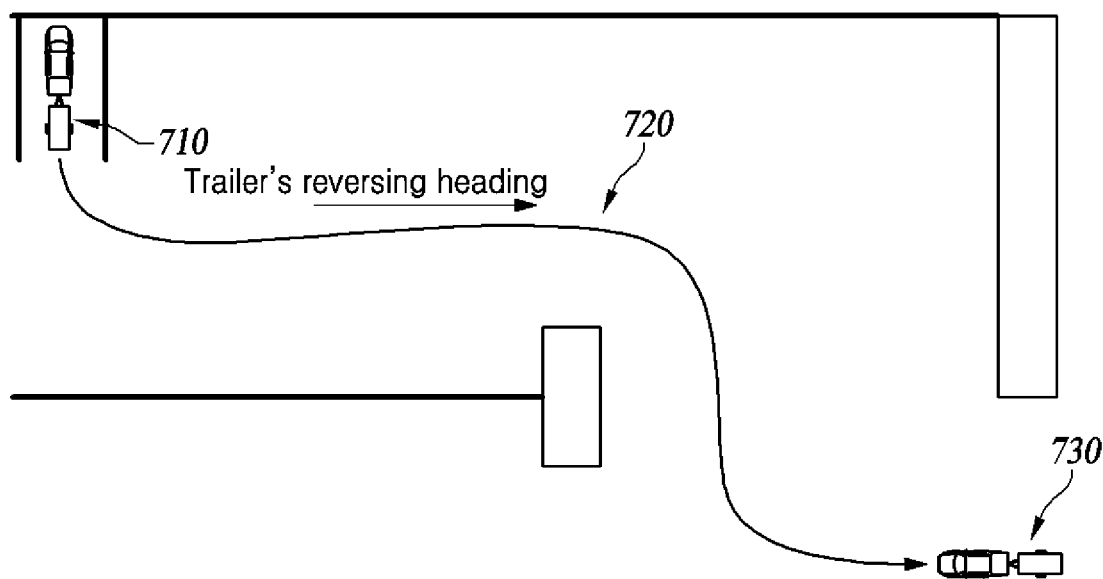
FIG. 7 is a diagram illustrating a path along which the trailer is reversed, in accordance with one or more embodiments.

FIG. 7 is a diagram illustrating a path along which the trailer is reversed, in accordance with one or more embodiments. A driver may activate the trailer reversing mode. The trailer reversing mode may correspond to a mode of reversing the trailer according to a path along which it has been moved. The driver may activate the trailer reversing mode and reverse the vehicle to reverse the trailer along the moving path.

Referring to FIG. 7, the driver may activate the trailer reversing mode at a location 710 where the trailer starts reversing. The vehicle control apparatus may reverse the trailer along the moving path 720. While the vehicle control apparatus reverses the trailer, the driver may terminate the reversing mode and directly drive the vehicle. At a location 730 where the reversing of the trailer is terminated, the vehicle control apparatus may return the right to control to the driver.

Figure 8:
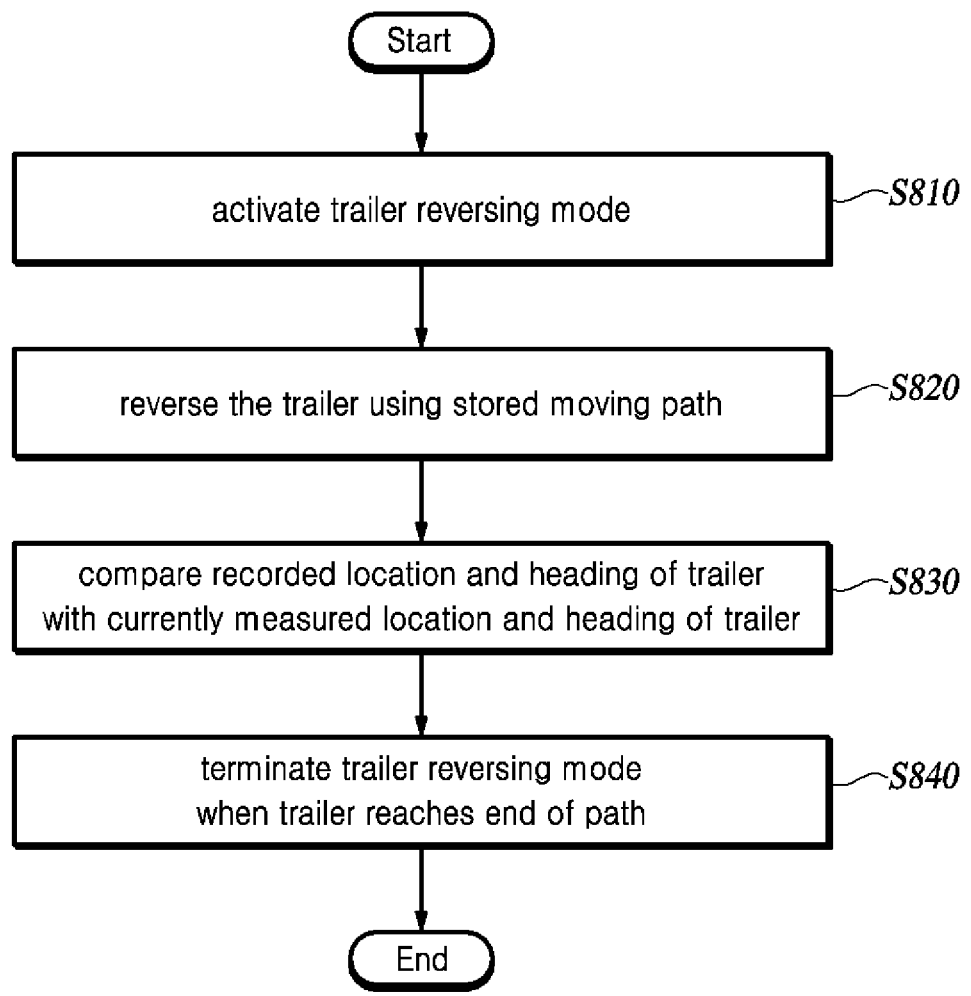
FIG. 8 is a diagram illustrating a process in which the trailer is reversed along a stored moving path, in accordance with one or more embodiments.

FIG. 8 is a diagram illustrating a process in which the trailer is reversed along a stored moving path, in accordance with one or more embodiments.

A driver may activate the trailer reversing mode to reverse the trailer (operation S810). The vehicle control apparatus may reverse the trailer using the stored moving path (operation S820). The vehicle control apparatus may compare the recorded location and heading of the trailer with the currently measured location and heading of the trailer (operation S830). While the trailer reversing mode is activated, the vehicle control apparatus may calculate the location and heading of the trailer using the measured location and heading of the vehicle and the hitch angle. The actually measured trailer location and angle may be continuously compared with the trailer location and angle in the stored moving path. The actually measured trailer location and angle may be compared in order from the trailer location and angle in the last stored moving path to the trailer location and angle in the first stored moving path. The trailer location and angle measured at a specific point may be compared with the trailer location and angle at a specific point in the stored moving path. Through this comparison, a difference between the actually measured trailer location and angle and the trailer location and angle in the stored moving path may be minimized. The vehicle control apparatus may reverse the trailer while minimizing the difference. When the trailer reaches the end of the moving path, the trailer reversing mode may be terminated (operation S840). While the trailer is reversing according to the trailer reversing mode, the driver may terminate the trailer reversing mode.

Figure 9:
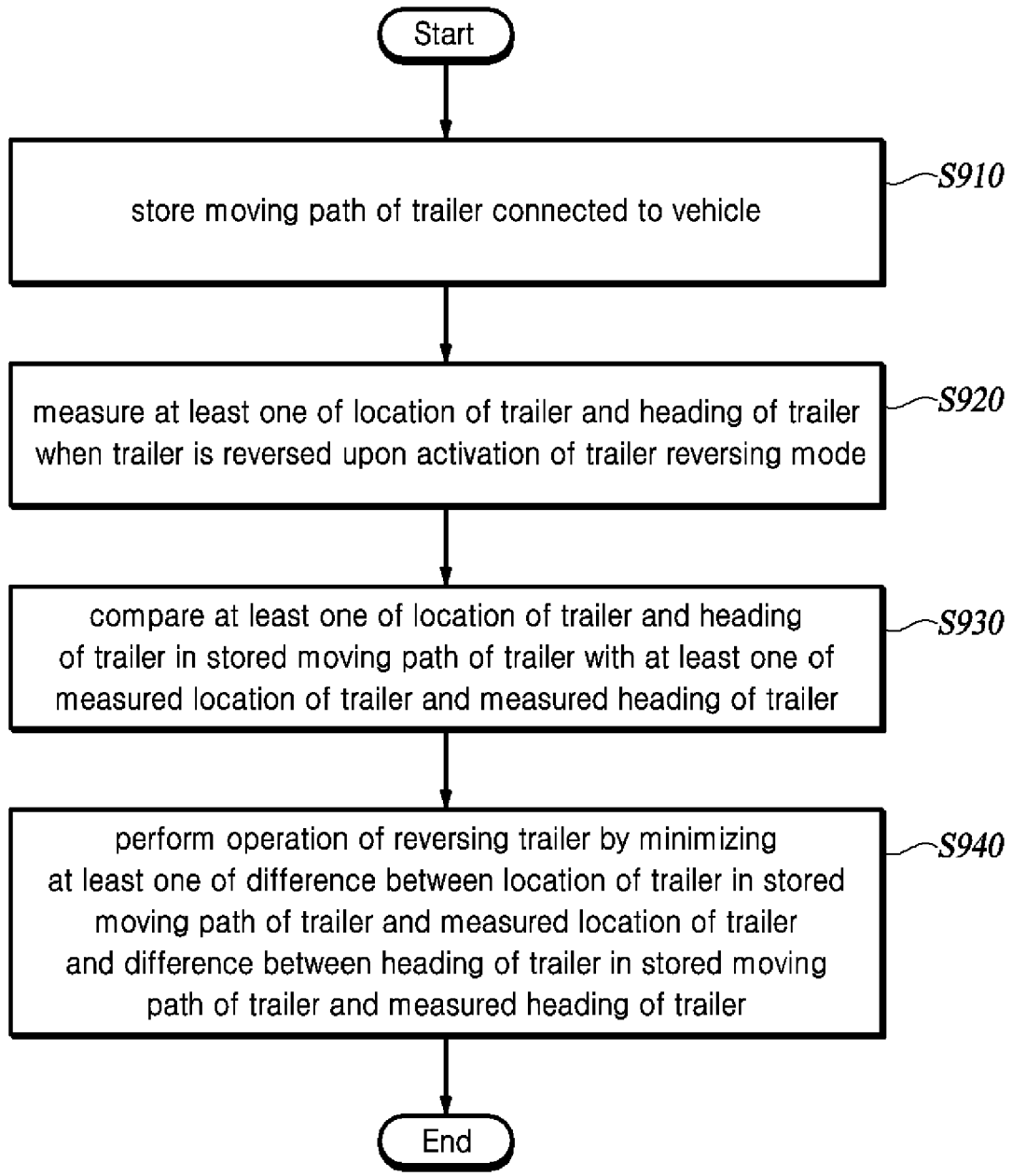
FIG. 9 is a diagram illustrating a vehicle control method performed by the vehicle control apparatus, in accordance with one or more embodiments.

FIG. 9 is a diagram illustrating a vehicle control method performed by the vehicle control apparatus, in accordance with one or more embodiments.

Referring to FIG. 9, the vehicle control apparatus may store the moving path of the trailer connected to the vehicle (operation S910). The moving path of the trailer is a path along which the trailer has been moved before reversing, and the trailer's location and heading in the trailer's moving path may be stored in the non-volatile memory of the vehicle. When a distance between the trailer's initial location and the trailer's current location exceeds a first predetermined threshold, the vehicle control apparatus may store a new location of the trailer. The first threshold may correspond to maxLstep. When a heading between the trailer's initial heading and the trailer's current heading exceeds a second predetermined threshold, the vehicle control apparatus may store a new heading of the trailer. The second threshold may correspond to maxTstep. The stored moving path of the trailer may correspond to a predetermined last section in a path where the driver drives the vehicle to move the trailer. When the number of trailer's location and heading records exceeds a third predetermined threshold, the initial location of the trailer may be set to another location. When the number of trailer's location and heading records exceeds the third predetermined threshold, the initial heading of the trailer may be set to another heading. The third threshold may correspond to maxLength-1.

When the trailer reversing mode is activated, the vehicle control apparatus may measure at least one of the location and heading of the trailer which is connected to the vehicle and is reversed (operation S920). Based on the location and heading of the vehicle and the angle of the hitch, at least one of the location and heading of the trailer may be measured. The vehicle control apparatus may compare at least one of the trailer's location and heading in the stored moving path of the trailer with at least one of the measured location and heading of the trailer (operation S930). The vehicle control apparatus may reverse the trailer by minimizing a difference between at least one of the trailer's location and heading in the stored moving path of the trailer and at least one of the measured location and heading of the trailer (operation S940).

The hitch-angle detection unit 110, the Ego inertia measurement unit and the wheel speed sensor unit 130, the trailer-pose estimation unit 140, the trailer-trajectory storage unit 150 in an ECU (Electric Control Unit) memory, the trailer-location check unit 160 in a stored path, and a trailer-backup control unit 170, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-9, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A vehicle control method, the method comprising:
   storing a moving path of a trailer connected to the vehicle when the vehicle moves;
   measuring at least one of a location of the trailer and a heading of the trailer when the trailer is reversed upon activation of a trailer reversing mode;
   comparing at least one of the location of the trailer and the heading of the trailer in the stored moving path of the trailer with at least one of the measured location of the trailer and the measured heading of the trailer; and
   minimizing at least one of a difference between the location of the trailer in the stored moving path of the trailer and the measured location of the trailer, and a difference between the heading of the trailer in the stored moving path of the trailer and the measured heading of the trailer, and then performing an operation of reversing the trailer, wherein the trailer is connected to the vehicle by a hitch, wherein the storing of the moving path of the trailer comprises storing a new location of the trailer when a distance between an initial location of the trailer and a current location of the trailer exceeds a first threshold, and wherein the initial location of the trailer is set to a different location when a location record count of the trailer and a heading record count of the trailer exceeds a second threshold.

2. The method of claim 1, wherein the stored moving path of the trailer is a path along which the trailer has been moved before the operation of reversing the trailer, and the location of the trailer and the heading of the trailer in the stored moving path of the trailer are stored in a non-volatile memory of the vehicle.

3. The method of claim 1, wherein the storing of the moving path of the trailer comprises:

storing a new heading of the trailer when a heading between an initial heading of the trailer and a current heading of the trailer exceeds a third threshold.

4. The method of claim 3, wherein the initial heading of the trailer is set to a different heading when the location record count of the trailer and the heading record count of the trailer exceeds a fourth threshold.

5. The method of claim 1, wherein the stored moving path of the trailer corresponds to a last section in a path where a driver of the vehicle drives the vehicle to move the trailer.

6. A vehicle control apparatus, the apparatus comprising:

a plurality of processors, wherein at least one of the processors is configured to:

store a moving path of a trailer connected to the vehicle when the vehicle moves, measure at least one of a location of the trailer and a heading of the trailer when the trailer is reversed upon activation of a trailer reversing mode;

compare at least one of the location of the trailer and the heading of the trailer in the stored moving path of the trailer with at least one of the measured location of the trailer and the measured heading of the trailer; and minimize at least one of a difference between the location of the trailer in the stored moving path of the trailer and the measured location of the trailer, and a difference between the heading of the trailer in the stored moving path of the trailer and the measured heading of the trailer, and then performing an operation of reversing the trailer, wherein the trailer is connected to the vehicle by a hitch, wherein the at least one processor is configured to store a new location of the trailer when a distance between an initial location of the trailer and a current location of the trailer exceeds a first threshold, and wherein the initial location of the trailer is set to a different location when a location record count of the trailer and a heading record count of the trailer exceeds a second threshold.

7. The apparatus of claim 6, wherein the stored moving path of the trailer is a path along which the trailer has been moved before the operation of reversing the trailer, and the location of the trailer and heading of the trailer in the stored moving path of the trailer are stored in a non-volatile memory of the vehicle.

8. The apparatus of claim 6, wherein the at least one processor is configured to store a new heading of the trailer when a heading between an initial heading of the trailer and a current heading of the trailer exceeds a third threshold.

9. The apparatus of claim 8, wherein the initial heading of the trailer is set to a different heading when the location of the record count of the trailer and the heading record count of the trailer exceeds a fourth threshold.

10. The apparatus of claim 6, wherein the stored moving path of the trailer corresponds to a last section in a path where a driver drives the vehicle to move the trailer.

11. The apparatus of claim 6, further comprising a memory, storing instructions that, when executed by the processor, configures the processor to perform the storing of the moving path, the measuring of the at least one of a location of the trailer and a heading of the trailer, the comparing at least one of the location of the trailer and the heading of the trailer, and the minimizing.

* * * * *